US007084991B2

(12) United States Patent
Miguel et al.

(10) Patent No.: US 7,084,991 B2
(45) Date of Patent: Aug. 1, 2006

(54) EXTERNALLY CUSTOMIZED TONAL-HIERARCHY CONFIGURATION AND COMPLEMENTARY BUSINESS ARRANGEMENTS, FOR INKJET PRINTING

(75) Inventors: Antoni Gil Miguel, Barcelona (ES); Francisco Guerrero, Barcelona (ES); Joan Manuel Garcia, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1238 days.

(21) Appl. No.: 09/775,771

(22) Filed: Jan. 31, 2001

(65) Prior Publication Data

US 2002/0176099 A1    Nov. 28, 2002

(51) Int. Cl.
*G06F 3/12* (2006.01)
*G06F 5/00* (2006.01)
*G06F 13/00* (2006.01)

(52) U.S. Cl. ............................ 358/1.1; 358/1.2; 358/1.8; 358/1.15

(58) Field of Classification Search .................. 358/1.1, 358/1.2, 1.8, 1.9, 3.23, 1.13–1.18, 502
See application file for complete search history.

(56) References Cited

U.S. PATENT DOCUMENTS

| 5,237,655 | A | * | 8/1993 | Statt et al. ................. 358/1.18 |
| 5,692,112 | A | * | 11/1997 | Brady ........................ 358/1.16 |
| 5,796,411 | A | * | 8/1998 | Cyman et al. ............... 358/1.1 |
| 5,802,589 | A | * | 9/1998 | Brady et al. ................. 711/157 |
| 5,828,814 | A | * | 10/1998 | Cyman et al. ............... 358/1.2 |

* cited by examiner

*Primary Examiner*—Scott A. Rogers
(74) *Attorney, Agent, or Firm*—Peter I. Lippman

(57) ABSTRACT

A printer is made by one firm; a RIP made/programmed by a separate RIP firm processes and sends to the printer image data; a two-bit data pipeline passes data through the RIP; a drop table converts data in the pipe to printer resolution. RIP firms set up the table with output dot-per-pixel structure different from the pipe. Ideally the table is in the printer but formed by the RIP; the RIP has precooked printmask instructions, and the printer, popup instructions to refine mask instructions; the instructions hide nozzle-out error and fix which pass prints each pixel; a computer, monitor etc. receive/create data and pass them to the RIP. Another aspect: a printer has a plural-bit data pipe, and interface to accept an external table to convert data from the pipe to numbers of dots per pixel. The interface best accepts a printmode recipe too.

25 Claims, 10 Drawing Sheets

| 1200 x 600 | Meaning, per cell_600 |
|---|---|
| 00 | Zero Drops |
| 01 | One Drop on the right |
| 10 | One Drop on the left |
| 11 | Two Drops |

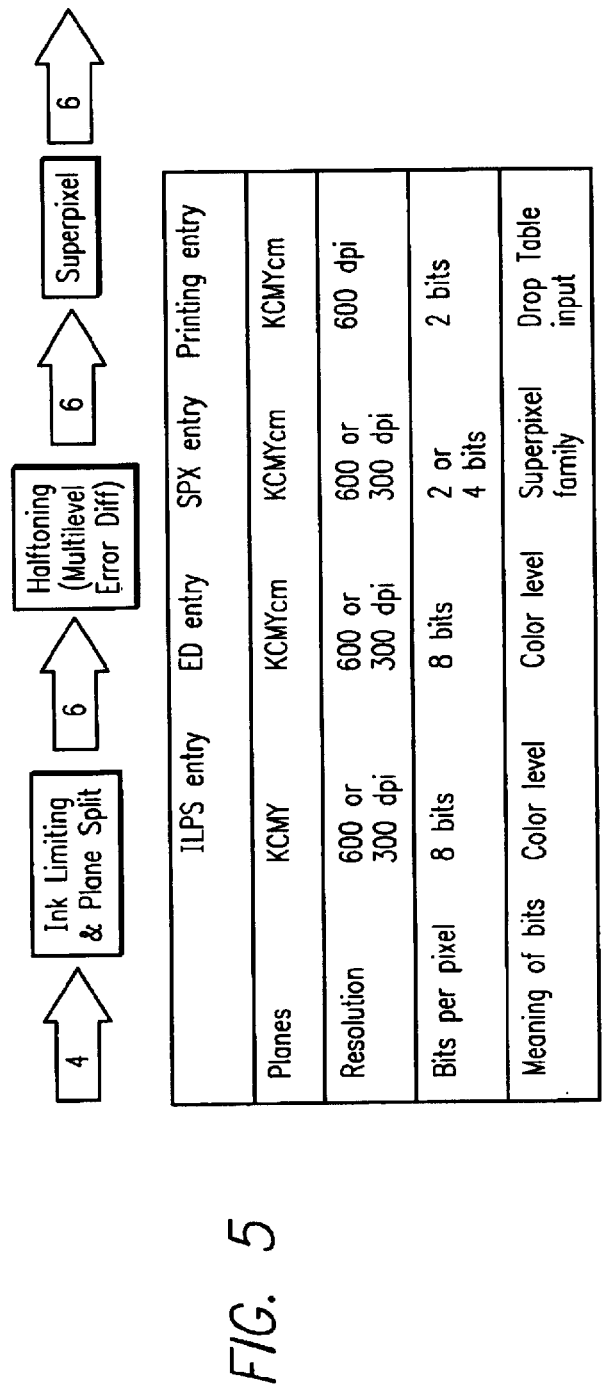

FIG. 6

| Max. Drops per Primary | 0 | A | B | C | Comments |
|---|---|---|---|---|---|
| 1 | 0 | 1 | 1 | 1 | Used for Diagnostic Plots and Economy Mode |
| 2 | 0 | 1 | 1 | 2 | Default for Stork (compatible with 1200x600, Binary) |
| 3 | 0 | 1 | 2 | 3 | For Backlit Media |
| 4 | 0 | 1 | 2 | 4 | Could be used for Canvas or Textile |
| 8 | 0 | 1 | 3 | 8 | A different printhead with 3 pl per drop can be accomodated into this pipeline as well |

FIG. 7

| Ed state | 0000 | 0001 | 0010 | 0011 | 0100 | 0101 | 0110 | 0111 |
|---|---|---|---|---|---|---|---|---|
| Super-pixel | 00 00 | 01 00 | 01 10 | 01 11 | 11 11 | 13 11 | 13 31 | 33 33 |
| # Drops | 0 | 1 | 2 | 3 | 4 | 5 | 6 | 8 |

FIG. 8

| ED state<br>SPX family | 0000 | 0001 | 0010 | 0011 | 0100 | 0101 | 0110 | 0111 |
|---|---|---|---|---|---|---|---|---|
| Permutation 0 | 00<br>00 | 01<br>00 | 01<br>10 | 01<br>11 | 11<br>11 | 13<br>11 | 13<br>31 | 33<br>33 |
| Permutation 1 | 00<br>00 | 10<br>00 | 10<br>01 | 10<br>11 | 11<br>11 | 31<br>11 | 31<br>13 | 33<br>33 |
| Permutation 2 | 00<br>00 | 00<br>10 | 11<br>00 | 11<br>01 | 11<br>11 | 11<br>13 | 33<br>11 | 33<br>33 |
| Permutation 3 | 00<br>00 | 00<br>01 | 01<br>01 | 11<br>10 | 11<br>11 | 11<br>31 | 13<br>13 | 33<br>33 |
| # Drops | 0 | 1 | 2 | 3 | 4 | 5 | 6 | 8 |

FIG. 9

| ED state SPX family | 00 | 01 | 10 | 11 |
|---|---|---|---|---|
| Permutation 0 | 0 | 1 | 1 | 3 |
| Permutation 1 | 0 | 1 | 1 | 3 |
| Permutation 2 | 0 | 1 | 1 | 3 |
| Permutation 3 | 0 | 1 | 1 | 3 |
| # Drops | 0 | 1 | 1 | 2 |

FIG. 10

EXTERNALLY CUSTOMIZED TONAL-HIERARCHY CONFIGURATION AND COMPLEMENTARY BUSINESS ARRANGEMENTS, FOR INKJET PRINTING

RELATED PATENT DOCUMENT

A related document is another, coowned U.S. utility-patent document hereby incorporated by reference in its entirety into this document. It is in the names of Joan Manel Garcia-Reyero et al., first filed as application Ser. No. 09/516,007, later converted to provisional 60/219,315, and then made to form a basis of a nonprovisional application Ser. No. 09/632,197, "IMPROVEMENTS IN AUTOMATED AND SEMIAUTOMATED PRINTMASK GENERATION FOR INCREMENTAL PRINTING", and issued as U.S. Pat. No. 6,443,556—and several earlier documents cited therein.

FIELD OF THE INVENTION

The invention relates generally to novel machines, operating procedures, and combinations of business procedures therewith, for incremental printing of text or graphics on printing media such as paper, transparency stock, or other glossy media, and myriad specialized surfaces ranging from virtually unabsorbent of ink to extremely absorbent; and more particularly to distributive industrial arrangements for implementing an especially versatile mechanism that accommodates the absorbencies and other idiosyncratic properties of those specialized surfaces.

BACKGROUND OF THE INVENTION (a) Modern improvements in management of patterning and grain—The Garcia invention mentioned above, together with previous related work, has brought to inkjet printing a remarkable, unprecedented degree of systematization and orderliness in the control of printmasking for suppression and balance of both patterning and random granularity. Those developments have created an opportunity for ready expansion of inkjet printing into many new applications that entail printing on a great variety of special-purpose printing media.

(b) The challenge of specialized print media—Such special purposes and their associated printing media may range from metal-foil-like materials, through bulk-matte synthetic papers, to extraordinarily porous fabrics or membranes. They are in fact so great in number that it is impractical for major manufacturers of inkjet printers—particularly large, printer/plotter-scale units suited for industrial use—to give adequate attention to the unique inking requirements of such diverse industrial materials.

Unfortunately for the resolution of this problem, conventional printing systems have factory-established fixed relationships between the data manipulations necessary to image rendition and the calorimetric tone hierarchies produced by actual ink on actual printing media. Such fixed relationships are essentially taken for granted in the industry.

Rendition calculations—particularly but not exclusively dither masking for commercial graphics, and error diffusion for photo-like and other continuous-tone images —are very well known in this field and extensively disclosed and discussed in dozens if not hundreds of patents on this subject. The later processing stage of printmasking is also very well elaborated in the patent and other literature, perhaps culminating in the Garcia innovations.

(c) Early partial responses to the challenge, and their limitations—Inkjet printers exhibit various approaches to accommodating diverse inking requirements. Common to substantially all these, however, is internal control, by the printer manufacturing company, over the above-mentioned relationships between rendition processing (and printmasking) and the tone hierarchies in the low-level output printing stage.

On one hand such control is extremely beneficial, because these relationships—while in most cases deceptively appearing simple and straightforward—are often inordinately demanding of attention from ink chemists, color scientists, and advanced programmers. The printer manufacturer's personnel may be best equipped to deal on a large scale with such problems.

On the other hand, many special printing materials are employed in relatively very specialized industries that cannot support more than a few large-format printers. Such industries may be popularly described as "niche" operations in that they cater to manufacturing or other industrial activities which are important in their own environments but virtually fit into mere small recesses in the overall industrial woodwork.

In such circumstances it becomes uneconomic for key personnel of an extremely large manufacturer to attend to such special needs on an individual basis. This problem is exacerbated by the relative ungainliness and large overhead associated with activities of a printer manufacturing firm.

(d) Advent of the nimble RIP—In recent years, the special needs and challenges of some of these niche applications have been undertaken, and very advantageously so, by companies that do not manufacture printers, or computers either—but rather manufacture a new kind of device known as a raster image processor. Such a special-purpose processor has most commonly taken the form of a physically separate, and separately manufactured and marketed, electronics module that takes on image-manipulating chores previously performed in the computer or printer, or both.

In many cases the processor justifies its existence simply by relieving the general-purpose computer of time-consuming massive computations, freeing that more versatile computer for a variety of other tasks more demanding of its general abilities. In other applications, however, the processor serves a higher purpose:

A relatively smaller company that manufactures raster image processors, by virtue of the greater economic and operational agility that goes with lesser size, is much better suited to address the science and engineering requirements of printing in a niche industry. Thus the processor company can be nimble enough to serve a need and make an attractive profit from operations that would be impractical for a printer company.

(e) Remaining limitations—Yet a partial obstacle to this solution remains. Conventionally, as mentioned above, the printer company—and the printer itself—provide to the outside world only a fixed relationship between rendition math and output tonal hierarchies.

This means that a processor company, having once determined that a special relationship is needed, must still beseech the printer company for installation of a custom ROM, or PROM, or in some cases an even more thoroughly buried functionality, that defines the rendition/output mapping. The last-mentioned situation may be typified by a need to circumvent a fixed operation built into an application-specific integrated circuit ("ASIC") that is a sort of hypothalamus in the printer.

Although in most situations an identifiable module containing the necessary mapping function is actually present in the printer, yet the problem remains because that module is relatively inaccessible to the processor company. Furthermore its syntax may be incompletely plain to even skilled programming personnel of the processor company.

(f) Known distributive tonal-hierarchy schemes—Nevertheless the raster image processor ("RIP") has earned a rightly established place in the inkjet printer industry, so much so that a current generation of some printer products includes a RIP that is essentially built in. This type of arrangement represents one new kind of partnering among business entities: in this case, for purposes of this document, the RIP manufacturer in practical effect (though not in legal effect) becomes a part of the printer company.

Here the RIP is very loosely an "internal RIP". The two companies are termed "affiliated".

Where a processor is instead sold separately, for purposes of this document the processor is called either simply a "processor" or an "external RIP"—and in practical effect the processor manufacturer does not become part of the printer company, and the two are termed "unaffiliated". The processor may most typically be installed by the end-user, or alternatively by a representative of the processor company; merely for purposes of this document, such an arrangement is not termed "partnering".

Both these kinds of distributive arrangements for managing tonal hierarchy have been classically known, at least in diverse industries, as "OEM" or "original-equipment manufacturer" situations. In some industries, only one or the other would be regarded as truly OEM.

(g) Conclusion—This discussion has focused upon limitations in the ability of both a printer company and a processor company—either one acting alone—to fully deal with needs of specialized printing applications. These limitations continue to impede achievement of uniformly excellent inkjet printing in greatly diverse industries. Thus important aspects of the technology used in the field of the invention are amenable to useful and important refinement.

SUMMARY OF THE DISCLOSURE

The present invention introduces such refinement. In part it does so by introducing new kinds of partnering among unaffiliated business entities; and in part it does so through a new kind of printer interface that accepts an externally defined drop table for converting plural-bit data from the end of a data pipeline to a specific number of dots per pixel.

In preferred embodiments of its first major independent facet or aspect, the invention is a printing system for printing an image based upon input image data. (The image data is not itself an element of the invention, but is rather a part of the environment or context of the invention.)

The system includes a printer manufactured by a printer company. Throughout this document the phrase "printer company" represents a complex of concepts including a company which manufactures printers; or one or more companies which affiliate or contract together to do so—in such a fashion that the finished printer can be sold as a unit by one or more of the companies.

The printer may (it does not necessarily) include a raster image processor ("RIP"), which if present may for example be (but is not necessarily) within the printer. For purposes of general verbal shorthand, such a RIP will be called very loosely an "internal RIP". As will be seen, it might equally well or better be called a "printer-company-&-affiliates RIP".

Thus for example the phrase "printer company" encompasses a business collaboration or consortium that includes a company which programs and/or makes a RIP for sale with the printer, together as a unit. Again, such an "internal RIP"—if present at all—may be but is not necessarily within the printer.

The printer has a native resolution. The system also includes a raster image processor that is manufactured and programmed by one or more processor companies, different from the printer company.

Also throughout this document this phrase "processor companies, different from the printer company" means companies that do not collaborate as described above to furnish a RIP which is sold as a unit with the printer. As a verbal shorthand, this processor will be called simply "the processor". Unlike the internal RIP described above, the processor is a necessary part of this first aspect of the invention.

Usually, but not necessarily, the processor under discussion here—in contrast to the RIP introduced earlier—is external to the printer. The processor therefore may also be called very loosely an "external RIP".

Thus the system may include an "internal RIP" provided by the printer company with affiliates; and does include "the processor", which is an "external RIP" provided by a third party—i.e. not the printer company/affiliates and not the end-purchaser/user, but a third party or plural such parties. This unit thus might equally well or better be called a "third-party RIP".

Central to the present invention is the idea that the processor companies are third-party vendors, not affiliates of the printer company but rather independent entities selling their RIP products directly to end-users or directly to retail outlets—separately from, but for use with, the printer. This characteristic considered alone is neither novel nor unique, but is so when considered together in conjunction with other elements of the combination described here. In addition to being novel and unique, this characteristic within the present combination is an extremely powerful and useful feature as will shortly be seen.

The processor processes such image data and transmits processed image data to the printer. The word "such" is used here in place of "the" or "said" to flag the image data, again, as not an element of the invention but rather something most typically provided by the end-user.

Also included in the system is a two-bit data pipeline carrying such in-process data through at least part of the processor. The concept of a data pipeline is well known to people who have ordinary skill in this field; and the phrase "two-bit" indicates literally that the data pipeline carries two individual binary bits of independent digital data for each picture-element (pixel) position in the corresponding image.

As is well known, two data bits may assume any of these four conditions:

| first bit | second bit |
|---|---|
| 0 | 0 |
| 0 | 1 |
| 1 | 0 |
| 1 | 1. |

Considered together, each of these bit pairs of course forms a two-bit binary number whose values can be written, in binary, as "00", "01", "10" and "11". It is equally well known that these four binary values correspond to decimal "0", "1", "2" and "3" resectively.

The system also includes a drop table for converting such data from the pipeline to the native resolution of the printer. The phrase "drop table" refers to drops—or resulting individual dots—of colorant, such as ink, respectively projected toward or formed on a printing medium, to construct the image.

The table is established by the previously mentioned "one or more processor companies different from the printer company". The table has an output dot-per-pixel structure that differs from the data structure within the pipeline.

The foregoing may represent a description or definition of the first aspect or facet of the invention in its broadest or most general form. Even as couched in these broad terms, however, it can be seen that this facet of the invention importantly advances the art.

In particular, although the processor or "external RIP" is designed, manufactured, programmed and sold separately from the printer—and although the printer is not specifically manufactured to print using any arbitrary output dot-per-pixel structure that may be favored by the designers, manufacturers and/or programmers of the processor or "external RIP"—nevertheless the printer drop table can in fact be used to cause the printer to print using any such arbitrarily favored output dot-per-pixel structure.

What this means is that the two-bit pipeline and drop table, in combination with the independent business arrangements described above, provide a remarkably potent tool for benefitting consumers while encouraging competitive, creative and constructive behavior on the part of processor companies. This benefit derives from enablement, by the data-structure conversion in the drop table, of an enormously broad range of data-interpretive capabilities.

In particular this beneficial arm's-length relationship facilitates and encourages a healthy and beneficial competition between the processor companies and the printer company. As noted above, the printer company may provide its own—or an affiliate's own—RIP which may even be internal to the printer, and this "internal RIP" may perform functions closely analogous to those of the processor companies.

As a practical matter the printer company may also supply the necessary syntax, parametric information etc. in an instruction manual to essentially any qualified processor company that wishes to have them. Thus the invention provides in effect a collegial challenge to the processor companies. It opens the door, in an ingenious fashion, to external control of the detailed printing modes of the printer—and thereby to original thinking about ways to control the printer.

Although the first major aspect of the invention thus significantly advances the art, nevertheless to optimize enjoyment of its benefits preferably the invention is practiced in conjunction with certain additional features or characteristics. In particular, preferably the table is configured by instructions held or generated in the raster image processor; in this case, a subpreference is that the table reside within the printer.

Another main preference is that the system further include, in the processor, precooked printmask information and procedures; and in the printer, popup printmask information and procedures for refining precooked mask information from the processor. In this case a subpreference is that the precooked and popup printmask information and procedures include nozzle-out error hiding; and also have a format that expressly defines which pass prints each pixel (as distinguished from provision of a discrete binary mask for each pass).

Another main preference, actually a set of alternative preferences, is that the table output dot-per-pixel structure is mapped to the data structure within the pipeline substantially as shown in any of the alternative "dots/pixel out" columns:

| within pipeline | dots/pixel out | | | | |
|---|---|---|---|---|---|
| | option 1 | option 2 | option 3 | option 4 | option 5 |
| 0 0 | 0 | 0 | 0 | 0 | 0 |
| 0 1 | 1 | 1 | 1 | 1 | 2 |
| 1 0 | 1 | 1 | 2 | 3 | 5 |
| 1 1 | 1 | 2 | 4 | 8 | 12 |

Although the system may as readily be configured to produce the binary-value identity relationship tabulated earlier, it will be understood that such a structure confers little benefit that cannot be achieved without the drop table, and is accordingly relatively trivial here.

Yet another main preference is that the system further include a computer for receiving or generating such image data, and transmitting such data to the processor. In this case, some subsidiary preferences are that:

the computer also be for preprocessing such received or generated image data, preparatory to transmitting to the processor;

in event the image is a color image, the system also include a monitor, associated with the computer, for viewing the image; and either the processor or the computer include at least part of a stage (i.e. a processing stage) for reconciling colors viewed at the monitor with colors to be printed at the printer.

In preferred embodiments of its second major independent facet or aspect, the invention is a method of providing a system for printing an image based on data. The printing is performed using a printer that is manufactured by a printer company, and has a native resolution.

As to this second aspect of the invention, and particularly for purposes of the appended claims, provision of the printer is not a step of the inventive method as most broadly conceived. Rather, the printer is assumed to exist, and its provision is a step that is an element of the context or environment of the invention.

(Thus the printer provision, in this method aspect of the invention, is somewhat analogous to the image data in the system aspect described earlier. The data and printer and the printer company—not being steps at all—are, for purposes of this method aspect, deemed elements of neither the invention nor its environment.)

The inventive method does include the step of manufacture and of programming—by one or more companies different from the printer company—of a raster image processor. The processor is for processing such data and transmitting the processed data to the printer.

Another step of the method is provision, by those "one or more companies", of a portion of a two-bit data pipeline carrying the in-process data through at least a part of the processor. Yet another step is establishment, by the one or more companies, of a drop table for converting the data from the pipeline to the native resolution. The table has an output dot-per-pixel structure that differs from data structure within the pipeline.

The foregoing may represent a description or definition of the second aspect or facet of the invention in its broadest or most general form. Even as couched in these broad terms, however, it can be seen that this facet of the invention importantly advances the art.

In particular, this method represents a portion of the effort involved in fabricating the system described above as the first aspect of the invention. Hence the benefits of that system are attributable as well to the present method invention.

All the steps of this method, as most broadly conceived, are performed by the processor companies. Their performance of these particular steps thus is the method covered by the corresponding ones of the appended claims; however, of course a processor company that performs these steps with respect to a printer owned by the owner of the present document is deemed to have an implied license hereunder.

Although the second major aspect of the invention thus significantly advances the art, nevertheless to optimize enjoyment of its benefits preferably the invention is practiced in conjunction with certain additional features or characteristics. In particular, preferably the method further includes manufacture, by the printer company, of the printer.

That is to say, whereas the method as most broadly conceived excludes fabrication of the printer, the method as here preferred includes that step. By definition, however, this preferred method can be performed only by two different business entities that are in substance mutually unaffiliated (as described earlier in discussion of the first aspect of the invention).

The definition of this preference is stated here to clarify conditions involved in enforcement of the corresponding appended claims. In other words, this patent document is potentially enforceable against a pair of mutually unaffiliated business entities that respectively perform the two complementary parts of the method.

Another basic preference is that the method also include interconnection of the processor and printer by an end-user independent of said companies. Thus again this method can be performed only by a processor company and such an unaffiliated end-user, if they respectively perform the complementary parts of this compound method.

In this case, a subpreference is that the method also include provision of a computer for preprocessing the data and furnishing the preprocessed data to the processor; and interconnection of the computer and processor. The latter step too is performed by the independent end-user.

In preferred embodiments of its third major independent facet or aspect, the invention is a method of providing a system for printing an image based on data. The system uses a raster image processor manufactured and programmed by one or more processor companies.

The processor has a portion of a two-bit data pipeline carrying the data through at least part of the processor. The processor also generates or holding instructions for configuring a printer drop table.

The preceding two introductory paragraphs establish the context for the method of the third aspect of the invention. This method as most broadly conceived thus excludes the portion of overall system fabrication and programming that is performed by the processor company or companies. The method itself is introduced below.

The method includes the step of manufacture and programming, by a printer company—different from the processor company or companies—of a printer for receiving the image data from the processor. The printer has a native resolution.

The method also includes the step of establishment, by the printer company, of a drop table within the printer. The table is for converting the data from the pipeline into the native resolution of the printer.

The table has an output dot-per-pixel structure that differs from data structure within the pipeline. The table is configured by the instructions.

The foregoing may represent a description or definition of the third aspect or facet of the invention in its broadest or most general form. Even as couched in these broad terms, however, it can be seen that this facet of the invention importantly advances the art.

In particular, this third aspect of the invention is complementary to the second aspect described earlier. That is, whereas the second aspect of the invention represents the portions of an overall printer-plus-processor system fabrication that are performed by the processor company or companies, this third aspect represents the portions performed by the printer company and affiliates. Hence this third aspect too advances the same benefits described earlier for the first, system aspect of the invention.

Although the third major aspect of the invention thus significantly advances the art, nevertheless to optimize enjoyment of its benefits preferably the invention is practiced in conjunction with certain additional features or characteristics. In particular, preferably the method also includes the step of manufacture and programming, by the one or more processor companies, of the processor.

Again, as a mirror image of the first preference described above for the second aspect of the invention, this present preference represents the combination of all system fabrication steps performed by both parties or groups of parties. (In fact it is thus substantially identical in scope to that first preference of the second aspect).

In this case a subpreference is that the method also include interconnection of the processor and printer by an end-user independent of the companies. To the overall fabrication, this step thus adds assembly.

Another basic preference is that the method also include the steps of providing a computer for preprocessing the data and furnishing the preprocessed data to the processor; and interconnecting the computer and processor. Both these steps are performed by the independent end-user.

In preferred embodiments of its fourth major independent facet or aspect, the invention is a printer for printing an image, based on input image data. The printer includes a plural-bit data pipeline capable of processing such data at more than one bit per pixel.

The printer also includes an interface for accepting an externally defined drop table. The table converts plural-bit data from the end of the pipeline to a specific number of dots per pixel, preparatory to printing. The number of dots per pixel defined by the table may be substantially any integral value (i.e. a number that is an integer).

The foregoing may represent a description or definition of the fourth aspect or facet of the invention in its broadest or most general form. Even as couched in these broad terms, however, it can be seen that this facet of the invention importantly advances the art.

In particular, the drop table enables externally controlled configuration of a customized, specialized relationship between the standardized data structure within the pipeline and an essentially arbitrary hierarchy of printable tonal-value states. Such versatility in the hierarchy of tone states is extremely valuable in accommodating unusual requirements of special-purpose print media.

Because the drop table is externally defined, this customized relationship can be imposed upon printer operations—and can be changed at will—at any time even long after the printer itself is made. Therefore the printer system is enabled to serve needs of special print media that do not yet exist when the printer is designed and manufactured, as well as many niche media products that are known when the printer is made—but may not be sufficiently widespread in use to justify specific tonal-hierarchy design by the printer company.

Although the fourth major aspect of the invention thus significantly advances the art, nevertheless to optimize enjoyment of its benefits preferably the invention is practiced in conjunction with certain additional features or characteristics. In particular, preferably the interface also accepts, in addition to the table:

plural-bit image data from the end of the pipeline, and a specification of a printmode defining how such data should be printed.

In this case the number of dots per pixel defined by the table may be substantially any integral value less than or equal to a number of passes defined by the printmode.

BRIEF DESCRIPTION OF THE DRAWINGS

FIG. 4 is a like drop table comparing:

Figure 1:
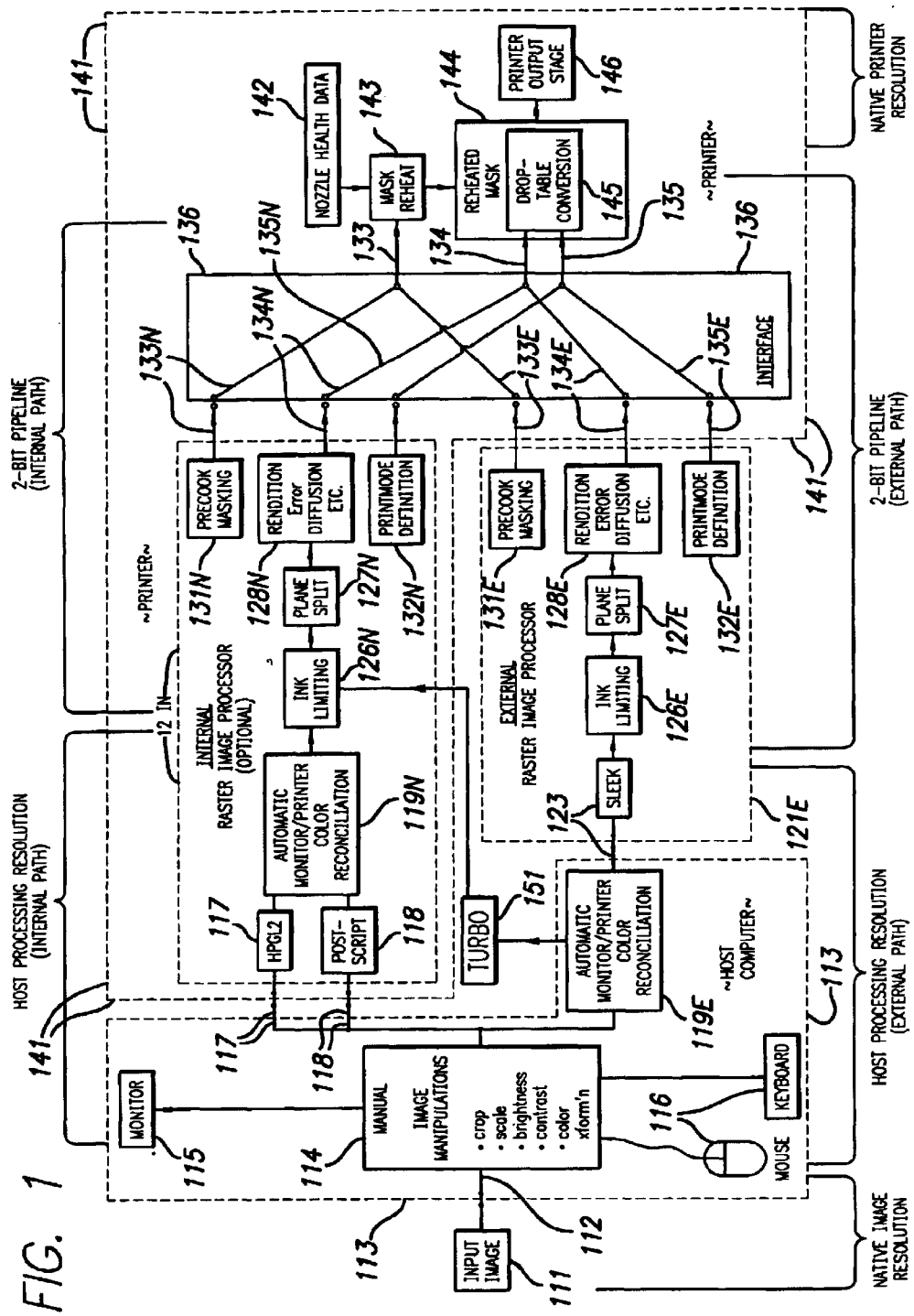
FIG. 1 is a high-level block diagram of a system according to the invention, also effectively illustrating the interwoven business arrangements of the invention—and particularly including not only the processor (or "external RIP") that is integral to the invention but also another, optional "internal RIP"
Figures 2, 3:
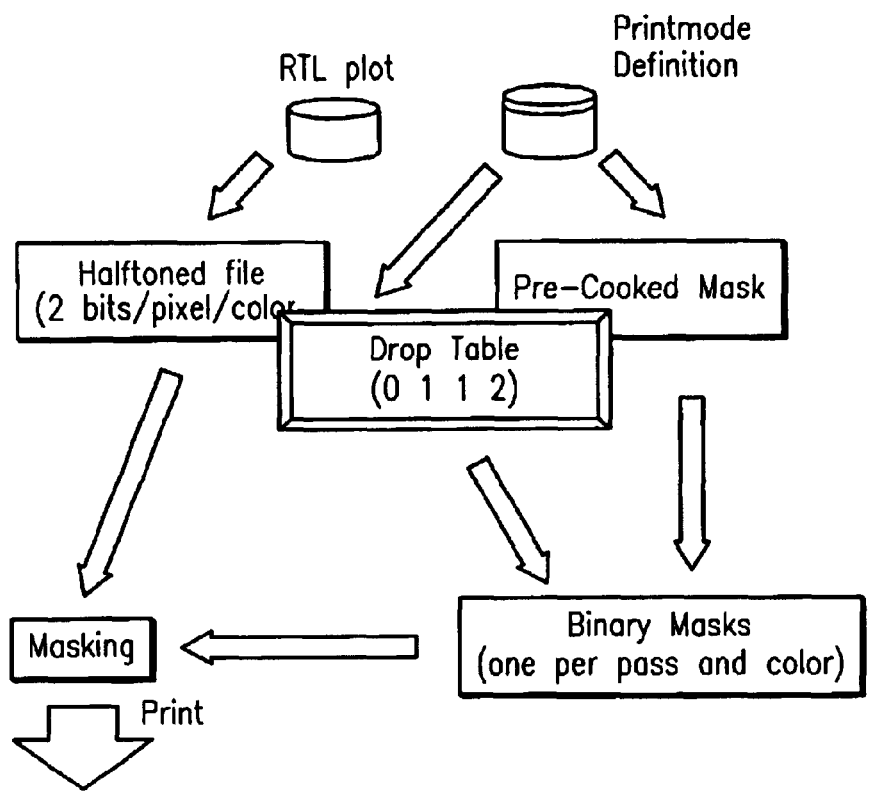
FIG. 2 is an analogous diagram but at a somewhat higher conceptual level and representing in a different perspective some of the functions of the assembled system.
FIG. 3 is a drop table illustrating a conventional, common binary relationship or mapping between a two-bit data structure and a two-pixel (actually two-subpixel) dot allocation or tonal hierarchy.
Figure 11:
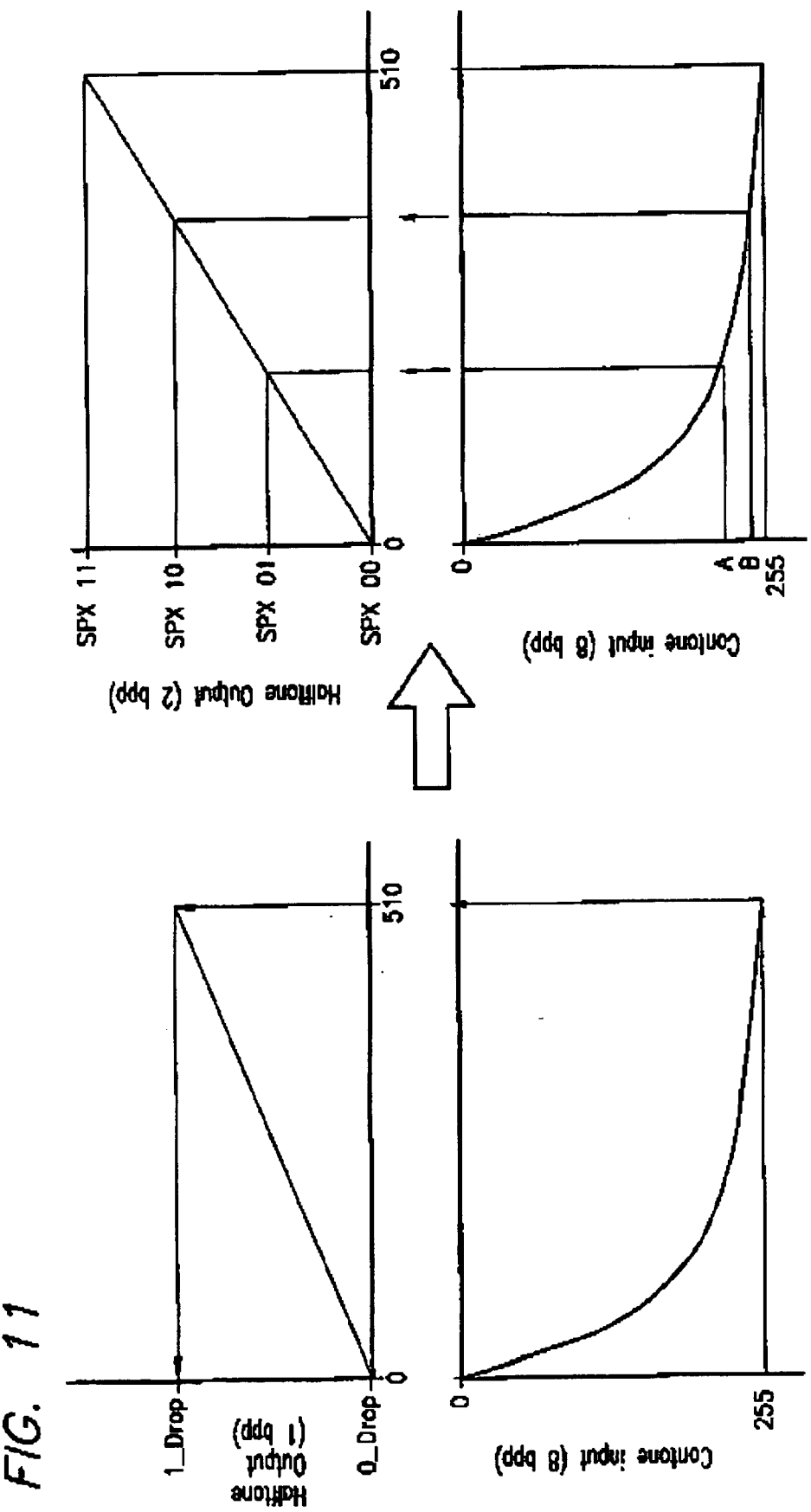
Figure 12:
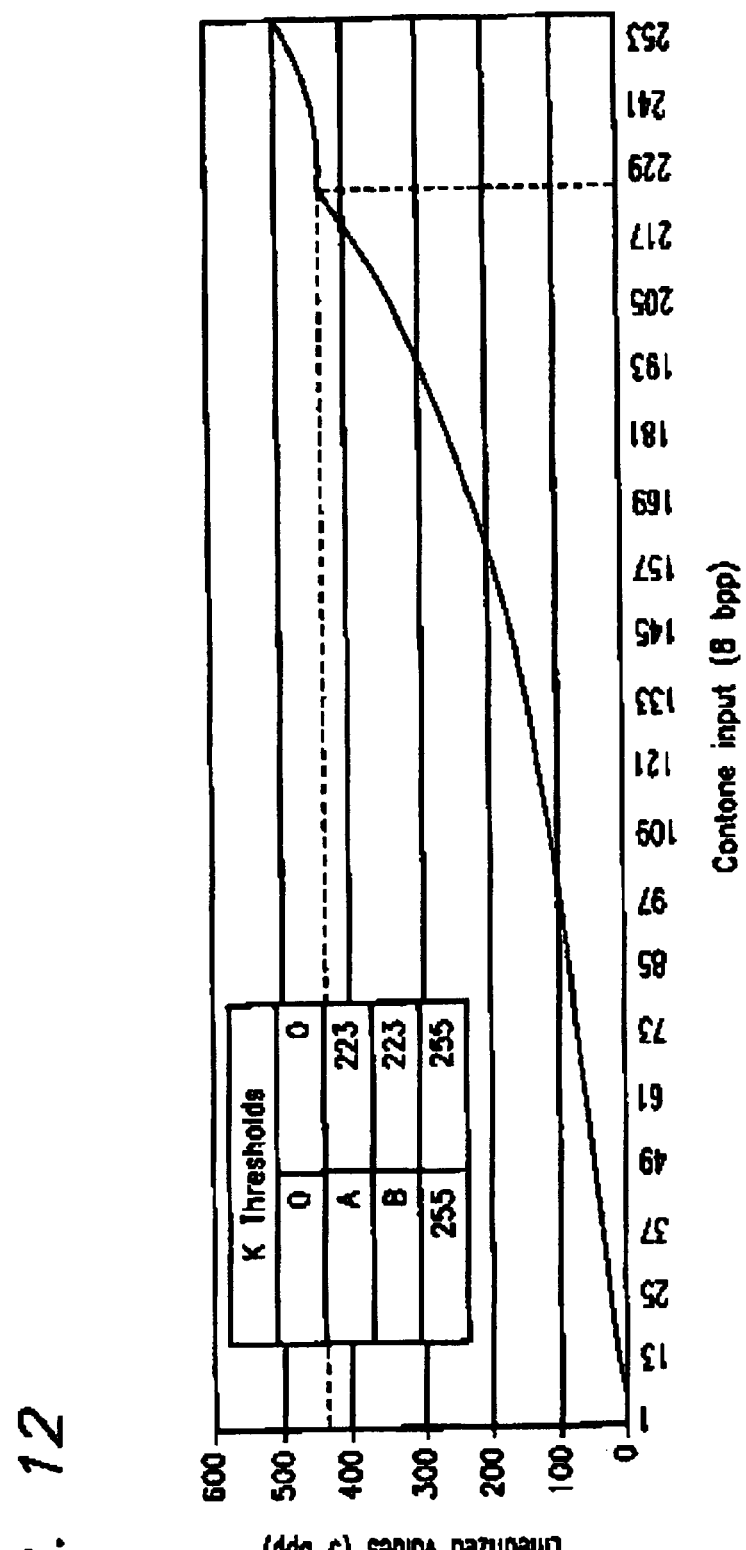
Figure 13:
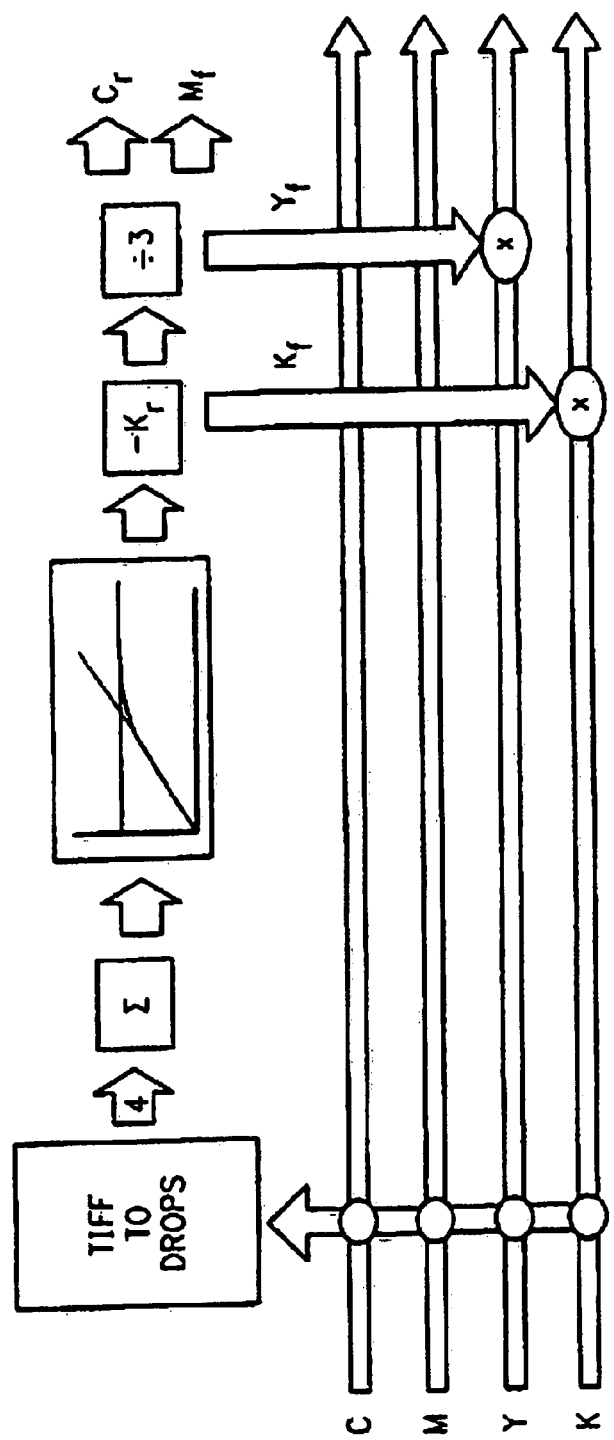
Figure 14:
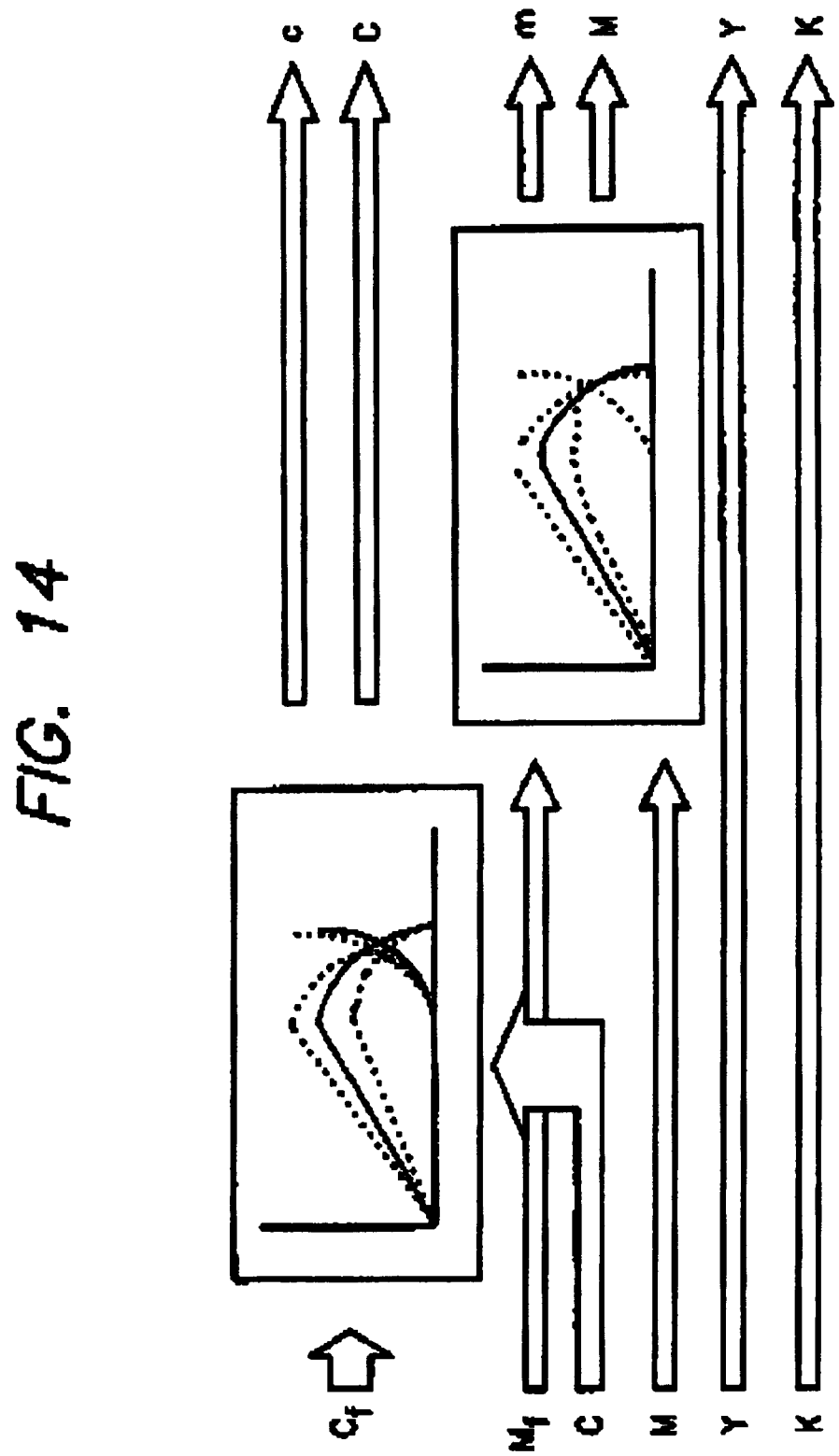

the FIG. 2 relationship—again, common binary, at resolution of 50×25 dots/mm (1200×600 dpi)—tabulated in units of dots or drops per unit cell at 25×25 dots/mm (600×600 dpi), with a much more highly generalized or abstract data-to-dot mapping (in this document familiarly called "true two-bit" and implemented at 25×25 dots/mm) that is a feature of the present invention;

FIG. 5 is a block diagram, with coordinated tabulation, illustrating the stages of a data-pipeline portion of the FIG. 1 system;

FIG. 6 is a table illustrating several specific data/dot mappings within the generalized FIG. 3 mapping;

FIG. 7 is a drop table illustrating superpixel definition for last-stage expression of a four-bit error-diffusion system;

FIG. 8 is a like table but showing superpixel definition in so-called "superpixel families", for four different permutations (identified as "0" through "3") of a four-bit system;

FIG. 9 is a diagram illustrating use of a so-called "expansion matrix" for conversion from error-diffusion state to superpixel assignment (in an example converting from 12 dots/mm and three bits, to 25 dots/mm and two bits);

FIG. 10 is a table illustrating a four-permutation superpixel definition (at 25×25 dots/mm);

FIG. 11 is a group of four coordinated graphs, of which the first (upper) pair of graphs relates halftone value to "contone" (continuous tone) color tonal level, for a single-bit binary system and a two-bit system — and so illustrate a conceptual extrapolation of error diffussion from binary to multibit; and of which the second (lower) pair of graphs represents the contone functions themselves — i. e., illustrates application of linearization curves and thresholds to multilevel error diffusion;

FIG. 12 is a like set of graphs augmented by two additional, coordinated ones representing the contone functions themselves—they illustrate application of linearization curves and thresholds to multilevel error diffusion;

FIG. 13 is a diagram like FIG. 4 but for the FIG. 1 ink-limiting and plane-split stages (particularly representing acquisition of the "factor" described in the associated text); and FIG. 14 is a highly schematic diagram showing cyan (C) and magenta (M) separation in the FIG. 13 limiting and split stages.

DETAILED DESCRIPTION OF PREFERRED EMBODIMENTS

1. Apparatus-module and Business-entity Interrelations

Preferred apparatus embodiments of the invention involve three major modules 113, 121E, 141 (FIG. 1), one of which can include an optional internal module 121N. Of these four units, two are parts of the environment of the invention, not elements of the invention itself as most broadly regarded: a computer 113 and an internal RIP 121N.

The remaining two units are elements of at least some of the previously introduced major apparatus aspects of the invention, again as most broadly conceived. These are the printer 141 (excluding its internal RIP 121N) and the processor or external RIP 121E. In addition, provision of one or the other of these two units 141, 121E is an element of at least one of the major method aspects of the invention.

Essential to the objectives of any such system or method is existence of an image 111, which may be derived from a separate source and then pass through an entry mechanism 112 into the computer 113 (as suggested in FIG. 1). There an image is most typically subject to modification in a general-purpose microprocessor 114, 119E that supports manually controlled image manipulations, using e. g. a mouse or keyboard (or both) 116—and guided by observation of the emerging image on a monitor 115 that is part of the computer.

Alternatively the image may be developed as original art within the computer 113, using the manual input device or devices 116. In either event the operator may perform any of a great variety of operations on the image.

Such operations usually range from near-mechanical processes such as cropping the image and scaling the resolution, through classical optical adjustments of brightness and contrast, to color transformations such as rotating the hue (in a polar-coordinate color space) and many other sophisticated effects. In addition the computer may be directed to perform certain automatic or semiautomatic operations such as correction 119E of output signals to reconcile—to the extent possible—known gamut divergences between the computer 113 and printer 141.

This latter color-correction module when within the computer 113 is typically intended to feed certain color paths that may lack their own such capability. This is true, for instance, of a route commercially known (for certain HP products) as a "Sleek" path 123 to the external processor 121E.

Such a lack, however, is not a necessary feature to use of the color-correction block in the computer. Thus the hybrid "Turbo" path 151 feeds into the optional internal RIP 121N even though the latter does have its own color-reconciliation block 119N—since this block in the internal RIP may lack sophistication needed for certain image or media characteristics.

The Turbo route 151 has been here denominated a hybrid, only because it follows neither the purely external-RIP ("processor") strategy nor the purely internal-RIP strategy. The Sleek path 123, by comparison, is dedicated exclusively to the processor (external RIP) 121E.

The Sleek path 123 is so named because (as will be seen) what enters the printer box 141 along that path—at its downstream end—as the diagram demonstrates is more nearly ready to print, requiring little processing by comparison. What enters the printer 141 via the Turbo path 151 and other paths 117, 118 instead remains to be processed extensively, although the Turbo route 151 requires much less processing within the printer 141 than information in the other paths 117, 118.

One reason for the difference in amount of processing required is that, in Hewlett Packard's implementations of such systems to-date, both the Sleek and Turbo routes 123, 151 are devoted to bitmap (or so-called "raster") operation. This characteristic is to be distinguished from the two language-based routes 117, 118 based respectively on Hewlett Packard Graphics Language 2® ("HPGL2"®) and on the Adobe PostScript® language—which are instead dedicated to vector-graphics processing.

As is well known in this field, extensive very elaborate interpretation is required to print from image data supplied in the usually more-compact vector form. In fact such data must be expressed in bitmap form.

If the data are in bitmap form initially, naturally they are much more nearly ready to instruct the printer final-output stage on a pixel-by-pixel basis as required.

As will be seen shortly, however, certain processing that is key to the present invention does remain downstream in all of these processing routes.

The processor 121E and the internal RIP 121N each do typically have their own ink-limiting and plane-split modules 126E, 127E—and 126N, 127N—respectively. In these blocks ink depletion is calculated to avoid excess ink deposition, and the cyan and magenta color planes are each split into two (light and dark, for each) in preparation for plane-by-plane rendition 128E, 128N.

This rendition may be conventionally performed for continuous-tone photo-like images by error diffusion as shown, or for commercial graphics and the like by dithering. Some other systems instead perform rendition in three-color space.

Three-color rendition may be accomplished, merely by way of example, either by dithering on a color vector as described in a coowned patent of Alexander Perumal and Paul Dillinger, or on a device-state basis through precalculated error-diffusion lookup tables as in another co-owned patent of Francis Bockman and Guo Li—or in other ways. The present invention is by no means limited to any particular rendition methodology. In the case of three-color rendition, the plane-split module 127E or 127N and the rendition block 128E or 128N are reversed in sequence.

At their downstream ends, all four data paths 117, 118, 151, 123 converge via an interface block 136 that simply provides major alternative data buses 134N, 134E leading to a common bus 134. This common bus passes the rendered data to a printmasking stage 144, which preferably but not necessarily adheres to the "reheated mask" paradigm introduced in the previously mentioned document of Garcia.

When the Garcia principles are observed, the mask is most typically initiated as a "precook masking" kernel 131N, 131E in the respective RIP. The kernel is passed at 133N or 133E respectively and then a common path 133 to the mask-reheating stage 143—which is custom-configured by nozzle-health data 142.

The latter information is derived automatically, based upon actual test-pattern measurement feedback 147 from the printer output stage 146. The nozzle data 142 are made to modify the mask kernel pseudorandomly.

More specifically, this is done in such a way as to approximately minimize adverse banding effects due to imperfect nozzle performance—but subject to balance against adverse granularity effects that can arise in highly randomized masking. All this is set forth at length in the Garcia document.

Now stepping back from the operational blocks it can be seen in the overview that the input image 111 ordinarily has an inherent or native resolution—as indicated along the bottom edge of the drawing. This resolution may be subject to cautious definition in the case of vector data, but nevertheless at least conceptually does exist.

In general, a different processing resolution prevails in the computer 113, and in those of the processor 121E or internal-RIP 121N stages which precede the ink-limiting stage 126N or 126E. In the drawing this fact is suggested by markings along top and bottom edges, referring to host processing resolution in the internal and external paths respectively.

A third processing "resolution"—actually a resolution analog but not truly a resolution, rather only an abstract so-called "bit depth"—is used in the portions of the system that begin with the ink-limiting 126N, 126E and end just within the reheated-mask stage 144. The bit depth is simply the number of bits per pixel.

This resolution analog, again in general (though not necessarily), is different from the resolution in the previous two stages. Specifically, the bit depth in these portions of the data transmission system or pipeline typically receives eight bits into the plane-split block 127N, 127E. The halftoning block 128N, 128E reduces that from eight to usually and preferably two—but in some cases four.

Superpixeling carries the output to most preferably two data bits. A greater number of bits is possible, within the scope of certain of the appended claims. The highest and best use of the principles of the invention, however, is believed to be realized when the number of bits is two.

Thus, even though a more-accurately broader perception of the invention calls for speaking of "plural" data bits, in this document the data transmission system from either ink-limiting block 126N, 126E into reheated-mask block 144 is familiarly called the "two-bit pipeline".

Finally the operating resolution is yet again in general (and most usually, though not necessarily) different in the final downstream operations. These begin just inside the reheated-mask module 144 and continue through the printer output stage 146 and onto the output hardcopy.

Myriad details of the printer output stage 146 and its transfer of image content onto a printing medium are shown and discussed in the Garcia document and its cited precursors, all wholly incorporated into the present document. It would be cumulative to repeat such a mass of description here.

The resolution in the printer output stage 146—and in portions of the reheated-mask stage 144 that follow a certain transition point—is marked at bottom of the diagram as the "native printer resolution". The transition point itself is in essence the drop-table conversion module 145—a memory location, within the printer, that accepts data constituting a drop table.

That module 145 thereby, as mentioned earlier, performs a translation or mapping of data states within the two-bit pipeline 126–135 into a hierarchy of tonal states (or, equivalently, drop-placement patterns) in the output stage 146. It thus maps the two-bit (or other plural) data of the pipeline into the native printer resolution.

In order for the drop-table conversion 145 to function, a conversion rule must in fact be explicitly specified. In other words, some desired mapping must reside in the drop table block 145 explicitly.

In most or all earlier systems this mapping has been in effect taken for granted, by virtue of being embedded (usually deeply) in fundamental, low-level system design. In the present invention, however, instead the mapping is expressly reserved for control either by engineering change or by aftermarket enterprise—as seen respectively in the "printmode definition" modules 132N, 132E of the internal RIP 121N and processor 121E.

Thus these definition blocks 132N, 132E supply information by converging data paths 135N, 135E and then a common path 135 for storage within the drop table. In this way, configuring of the drop table 145—very close to the intrinsic core of the printer data-structure configuration—as well as mask reheating 143 is directly controlled by engineering redirection or aftermarket creativity manifested in the kernel and definitional blocks 131N, 132N and 131E, 132E respectively.

These functions are shown with a somewhat different, functional emphasis in FIG. 2, which is believed to be self explanatory. The net effect is an invitation to processor vendors:

provide a 25 dot/mm, 2 bit/pixel, six-color plot file, define a printmode including a precooked mask and drop table, and the printer will print your plot— in such a way that each of the four states represented by the two bits per pixel and color may correspond to any combination of drops that you like, up to (at least) the number of passes that you define in the printmode.

The vendor has full control of the number of drops assigned to each state within the pipeline—although as a practical matter the first state, zero, is very preferably translated as zero, i.e. maintained without modification.

All of this redounds positively to the benefit of the end-user, who has a wide range of RIPs available for the printer. In particular the internal one has some clear advantages (ease of use, self-contained, well-tuned) and the external one having others (flexibility, job management, control over color profiles).

Preferred embodiments of the invention relate to three features that have now been described with reference to FIG. 1. One of these features is the provision of a masking kernel 131N, 131E, fed to the mask-reheat function 143 in the printer 141 proper (i.e. not in the internal RIP 121N).

A second of these features is configuring of the data-structure conversion by the definitional data 132N, 132E, analogously fed to the drop table 145 also in the printer proper.

In particular when the kernel or definitional data, or preferably both, reside in the processor 121E—the external RIP—at least one very deeply intrinsic performance parameter is, abruptly, controlled directly by manufacturing or programming personnel who are entirely outside the printer design and manufacturing functions.

Thus it is necessary to call special attention to the third and perhaps most subtle of the three features, since it may otherwise pass unrecognized even though in a sense it may be the most extraordinary and striking. The very conversion of data at a fundamental structural level, from processing data to printer data, is controlled distributively as between two business entities that are by definition unaffiliated:

the printer company, which is responsible for everything in block 141 except the contents of the drop table 145 and the starting point for operation of the masking function 143, 144; and the processor company, responsible for the processor 121E and thereby the contents of the drop table and the kernel for reheating.

Thus the invention permits the processor company to reach directly into the heart of the printer operation and control its pulse there.

2. Mode of Control; the "True 2-Bit Pipeline"

This invention represents upgrades and refinements to a multilevel pipeline originally developed in the Hewlett Packard organization for a 50×25 dots/mm (1200×600 dpi), binary swath format—to 25×25 dots/mm (600×600 dpi), 2 bit/pixel swath format. This means that the system can address a plural number of drops onto a single cell, and that it is possible to choose among four different number of drops to print on each cell.

Although the same functionality can be achieved through other means in other HP products, a great advantage of the described method is that it can be fully configurable from external files—which can be created by HP engineers, third-party media vendors or even external software RIP vendors—thus allowing different numbers of drops per pixel, depending on the ink and media types to be used.

Other printers usually provide dedicated code depending on the total number of drops to printed at each pixel. Halftoning and printmask generation processes must generally be tuned for each special circumstance.

The present invention, familiarly called the "True 2-Bit Pipeline", has as its main objective extraction of the greatest possible benefit from the two bits that are assigned to a 25×25 /mm cell at the printing stage. This is accomplished in part by reserving until the far end of the pipeline the functional decision of how many bits to print on each pixel.

Further, the decision itself is configurable through the printmode definition—but more remarkably through a programming language called "Var-Ware Plus", which HP provides in a fully documented package for use by RIP vendors. The printer thereby implements a function that uniquely, on a one-to-one basis, relates the already-halftoned value for each pixel to the number of drops that are going to be fired. This function as discussed earlier is manifested in the drop table.

An advantage of the True 2-Bit pipeline is that it allows optimizing the pipeline for maximum image quality, and maximum robustness to banding—and in the future other optimizations. These benefits can be permitted only by a multilevel, plural-bit pipeline, and two bits appear to represent a best-tradeoff compromise for flexibility, robustness and image quality.

One bit per pixel does not provide room for robustness: while it does uniquely aim for maximum image quality, it is very susceptible to banding. On the other hand, printing more than two bits per pixel (or allowing more than four different drop counts per pixel) may be a form of overkill that nevertheless provides no improvement in granularity.

As an example, printing at 50×25 dot/mm, two bits, can provide very similar color depth and less granularity than 25×25, four bits—while still handling the same amount of data. On the other hand, printing at 50×50, one bit, will yield best possible granularity, but will be much more susceptible to banding, and will show more variability from plot to plot.

Finally, the True 2-Bit pipeline is consistently linked to printmask generation techniques (particularly the Shakes regimen of Garcia), which automatically adapt to the drop table that has been defined for that particular plot. Actually, the same precooked mask can be used, regardless of the maximum number of drops that we define for a printmode.

It is in the "cooking" (or "reheating") stage that the drop-table information is taken into account. The word "true" is used to symbolize the generality of the system—i.e., that the system can implement any desired structure of four different drop counts—although it is very highly preferable that the first one always be zero.

Examples include [0, 1, 1, 2], [0, 1, 2, 4], [0, 1, 3, 8], etc., and for backward compatibility even [0, 1, 1, 1]. In contrast, without the drop table the four states transmitted from the dithering (and superpixeling) stage would uniquely mean [0, 1, 2, 3] drops.

The True 2-Bit Pipeline can be conceptualized as part of a parallel process. On one side, the image to be printed is processed, and on the other the printmasks are prepared for that specific point in time, taking printhead nozzle health into account as described earlier. The present document relates to the former aspect, while the latter is disclosed in the earlier Garcia document and other sources which it cites.

3. Development History

This pipeline is one of HP's first to provide plural-bit error diffusion and multilevel printing.

A preliminary basic product definition specified 50×25 dots/mm. This specification made two bits available for each cell considered at the coarser resolution of 25×25 dots/mm—i.e. one bit for each of two drops that would be printed at 50×25—and these two bits allowed encoding of the information in the table of FIG. 3.

Rendering at 50×25 dots/mm, however, is very seldom done. For best use of existing refined subsystems, it was desirable to render at 25×25, two bits per pixel, and then for printing reorganize the data into 50×25. It was decided to enable both 50×25 and 25×25, at two bits.

For halftoning, a particular goal is to deliver printing data at 25×25 dots/mm and two bits per pixel. Another objective is an ability to print continuously—which can be accomplished by rendering one plot at the same throughput with which it is later printed, so that the printer can print one job and render another one in parallel.

To do so in productivity and economy modes, it is necessary to halftone at a lower resolution. That is, if the system rendered to 12×12 dots/mm and halftoned at that resolution, throughput would be accelerated by a factor of four—but with a resulting problem, namely the evident loss in resolution.

For an imaging product as distinguished from a vector-drawing product, resolution usually or almost always is less important than maintaining color depth. That is, the system must be able to distinguish among a sufficient number of tonal levels within each cell—and, if this constraint is observed, then a halftoned image at 12×12 dots/mm and three bits per pixel may not show a significant degradation in image quality as compared with 25×25, two bits.

The situation was different for earlier one-bit (pure binary) printers, in which 12×12 dots/mm was significantly worse than 25×25. In order to adapt the 12×12 three-bit format into the 25×25 two-bit that the printing pipeline expects, the superpixel concept was introduced.

Superpixeling expands the resolution of the printed image, from whatever has been delivered by the halftoning algorithms to the 25×25 and two bits required by the printing pipeline. At the same time, the bit depth is decreased.

An additional consideration is the desirability of upgrading a system from four to six printheads. Such enhancement requires the capability to split the cyan (C) and magenta (M) planes into a total of four: dark and light cyan (C and c), and dark and light magenta (M and m) —and at the same time ink limiting must be considered. In preferred embodiments, this process has been implemented upstream from the halftoning stage.

4. The Abstraction of the "True" 2-Bit Pipe

In addition to all the above-introduced considerations, a further advantage of the two bits per pixel can also be taken if they are not associated with any particular way of printing. This abstract concept is represented in the table of FIG. 4.

As there shown, the four different two-bit combinations can be used to configure four different states, when the number of drops per 25×25 dot/mm cell is considered. Advantageously and very preferably, although in purest principle not necessarily, the only restrictions at this abstract level are that (1) the first level actually translate into zero, and (2) the number of drops at the four levels in sequence form a monotonic pattern:

$$0 \leq A \leq B \leq C.$$

This "true 2-bit pipeline" concept represents a very useful and surprisingly powerful abstraction. In this system all the data are processed in abstract terms—purely bits and states. Only at the very end of the process does the system then impose the correspondence between states and number of drops (FIG. 5).

The remainder of this discussion explores the illustrated system. It has been found that greater clarity dictates arranging the explanation in reverse order of the sequence of modules—i.e. from back to front. As will be seen, each downstream block naturally demands a certain input format, and these demands in turn provide a natural explanation for the structure of the previous block.

5. The Drop Table

At this near-final stage, the image is almost ready to print. The printing mechanism output stage is in essence like various other printer heads on a scanning carriage: in a plural-pass printmode, it passes a certain number of times over every row of pixels.

If the system is using a printmode having a number N of passes, then it has N chances to print a drop on each pixel. Unlike other HP inkjet printers, however, this system can take advantage of these N chances repeatedly—and thereby can print more than one drop per pixel.

The masking pipeline disclosed in earlier Garcia documents, along with the true 2-bit pipeline introduced here, provides a solution for printing any number of drops per pixel. In preferred embodiments, now at this more practical level, an additional restriction is desirable—namely, that the maximum number of drops, C, be equal or smaller than the number of passes, N.

With this in mind, one very important decision is how many drops of each primary color to use. Because the system is a "true 2-bit pipeline", the drop table can be designed like any of examples in the table of FIG. 6.

The table gives meaning to the superpixel definition that will be chosen.

6. Superpixeling

Next proceeding upstream or "backward" from the drop table, in FIG. 5: superpixeling is the last stage of the halftoning pipeline. The superpixels are basically intended to interface from any resolution that comes from the error-diffusion process, into the 25×25 dots/mm, 2 bits/pixel, that will feed into the final output-stage print engine.

Superpixels are defined for resolution values of 6, 12 and 25 dots/mm (150, 300 and 600 dpi). The 25 to 25 dot/mm conversion is essentially an identity, while discussion of the 6 to 25 dot/mm conversion begins to be confusing.

Therefore this discussion will first examine the 12 to 25 dot/mm case, as the best example to use. The 25 to 25 dot/mm case will also be presented later.

A first consideration is what drop table is in use. If it is [0 1 1 2], which is a preferred default table in a present product, then in this case, we have four possible inputs—in other words, independent-variable values —to the table (0, 1, 2 and 3) but "1" and "2" both translate into the same output: they both correspond to 1 drop.

Therefore, input state "2" will be unused in the superpixel definitions. The superpixels from 12 to 25 dots/mm represent that, for any given code that applies to a 12×12 dot/mm cell, codes to the corresponding four 25×25 dot/mm cells must be assigned.

Because it has been decided to print a maximum of two drops per 25×25 dot/mm cell, we can only find a maximum of eight drops per 12×12 dot/mm cell. Error diffusion delivers 12×12 dots/mm, four bits (therefore, sixteen states), but only eight different states will be defined.

The eight states will correspond to [0 1 2 3 4 5 6 8] drops. (At least in principle a greater number of states can be defined, though some of these may correspond to a fractional number of drops. A coowned patent in the name of Ronald A. Askeland deals with implementation of fractional drops.)

As a start, one may adopt the assignment between error-diffusion ("ED") states and superpixels appearing in FIG. 7. Here the ED states "1XXX" are equivalent to state 0111, and are not used in this particular implementation —because it has been decided to use only eight states. They could be used, at the designer's choice, by following the same principles here explained.

As illustrated, a different entry to the drop table is defined for every 25×25 dot/mm cell: the 2×2 space inside the 12×12 dot/mm cell that was rendered is defined at a 25×25 dot/mm resolution. We see that 0, 1 or 3 is used in every 25×25 cell, which will correspond to 0, 1 and 2 drops respectively. As a result, the two-by-two array of 25×25 cells totals the number of drops depicted in the bottom row.

Because only color depth is under consideration, the definition of each individual drop inside the 12×12 cell is completely arbitrary. Whatever solution is chosen, there is a risk of creating patterning in event the same superpixel is tiled all over an area.

To minimize the chances for patterning, two new concepts are used: the superpixel family and the superpixel expansion matrix. Instead of defining a single superpixel with a given number of drops, four will be defined.

The four superpixels that contain the same number of drops and that, therefore, have equivalent color depth, will be referred to as a superpixel family. A coowned patent in the name of Ronald A. Askeland introduces the like concept of calorimetrically equivalent superpixels. Every member in the family will be referred to as a permutation. The superpixel families are organized as shown in the table of FIG. 8.

Now the objective has become to choose one superpixel permutation per 12×12 dot/mm cell. The error-diffusion state only points to the proper superpixel family, since any member of the family has the same color depth, and is therefore a valid implementation for that given ED state.

In order to actually choose the permutation for a given 12×12 dot/mm cell, a procedure familiarly called "lottery matrix" will be used. This is the more formally denominated Superpixel Expansion Matrix.

The matrix is defined as a function of the pixel location. The design criterion is that, if ED delivers the same state in a wide area, then the system will always have to select a superpixel from the same family.

Permutations will then be selected, with a noise characteristic that is pleasant to the eye—specifically, that minimizes granularity. Different algorithms can be used for expansion-matrix design:

It is possible to begin from a blue-noise matrix, or generate a fuzzy mask with the Shakes procedures, or just make the matrix manually. It is also possible to choose equally among all the permutations—that is, to use each permutation one-quarter of the time—or to use them in different proportions.

Finally, it is possible to choose a small matrix or a large one. A larger matrix will show less patterning, but require more system memory. FIG. 9 provides an example of how it all works together, when the above superpixel definition is applied.

As noted earlier, it remains to document the 25 dot/mm to 25 dot/mm superpixel family (FIG. 10). It can be considered an identity, and is uninteresting.

This time the application goes from a 25×25 dot/mm cell to a 25×25 dot/mm cell. The present inventors advise against use of superpixel families that average a nonintegral number of drops, as increased granularity results.

7. Halftoning

The stage that feeds superpixeling is the halftoning algorithm. A preferred algorithm for use with the present invention is error diffusion.

Error diffusion is very well known in this field. It was originally conceived as a way to transform data from multibit to binary (that is, single-bit). As an example consider an area fill, defined at 25 dots/mm, 8 bits per pixel. The whole area has the same value: tonal level 130 (in a conventional scale from zero through 255).

The only available choice is between firing a drop on a given pixel location or not firing it. If the input value is 0, then the system refrains from firing (0). If instead the input value is 255, then the system fires (1).

If the input value is somewhere in between, then the system goes to the closest point, but it has committed an error; therefore it must try to commit the error in the inverse sense when moving to the neighboring pixels.

In the example, tonal value for the first pixel is 130. This is closer to 255 than to 0, so the system decides to fire (1). It has committed an error of +125, that it must then distribute among the neighbor pixels.

Assume that the next pixel receives a fourth part of the error of the previous pixel (that is, −31 counts). Then, the system must calculate that the second pixel has a value of 130−31=99. This total input value of 99 is closer to 0, so the system decides not to fire (0)—but thereby it commits an error of −99, that in turn it must propagate to the surrounding pixels (some of which will also receive error from the first pixel). This process proceeds through hundreds of thousands, or millions, of iterations to complete an image.

To fit this algorithm into the present invention, a few modifications are required. These are explored in the two subsections below.

(a) Multilevel error diffusion: thresholds—A first step is to conceive of a way to implement the binary outcome of classical error diffusion into a multievent (i.e. multibit) outcome. That is, it is no longer a binary decision between firing or not firing a drop, but rather which superpixel family to choose.

If the system is halftoning at 25 dots/mm, two bits, we'll have four superpixel families to choose among. The concept must be scalable to 12 dots/mm at four bits (sixteen superpixel families)—and even further, to six dots/mm, four bits.

FIG. 11 shows (in the tow upper graphs) how the error diffusion algorithm can be expanded from binary to multibit. At the same time, the output value has been decoupled from the actual number of drops being fired.

The graphs show how the contone input can be divided into a number of regions equal to $2n-1$, corresponding to n bits per pixel at the output. Besides the two natural thresholds, which are 0 and 255, new thresholds appear: A and B.

Using this strategy, input values that are closer to A generate an output to superpixel ("SPX") family 01; those closer to B will be assigned to SPX 10, and so on. Errors propagate in the classical way described above.

This explanation is the real picture for a 2 bit/pixel output, easily expanded to 4 bit/pixel or whatever is required. Although FIG. 2 shows the ED thresholds A and B equally spaced from 0 and 255, because of linearization considerations this relationship is not maintained.

(b) Linearization—The classical ED algorithm was originally conceived for monitor screens. On a monitor screen each pixel is clearly bounded, and never overlaps with the surrounding pixels. These constraints facilitate good linear response of the algorithm.

In inkjet printing, however, the printed drops do overlap. The macroscopic result is, that error diffusion is no longer linear.

It is accordingly widely known in this field that a linearization file should be created. The linearization file is applied to the continuous-tone information in advance of ED processing (FIG. 11, lower graphs).

The composite of the two functions linearization and error diffusion is supposed to be the identity—so that a linear contone gradient still comes out linear, once halftoned. In addition, because the linearization curve may assign a single image tone to different consecutive inputs and thereby create contouring, the linearization function also transforms the data from eight bits to nine. This transformation minimizes the contouring effect.

The graphs also show how the intermediate thresholds A, B are not evenly spaced relative to 0, 255: their spacing too contributes to the linearization process. Also evident is that the linearization curve is the main contributor in lower-tone regions (0 to A), whereas it is practically a straight line as the different thresholds approach more closely (A to B, B to 255). Therefore when the system halftones at 25 dots/mm at four bits, most of the linearization work can be done through the threshold definition.

(c) Linearization and threshold examples—Finally, the result for a real case in a preferred embodiment (with drop table of [0 1 1 2] at 25 dots/mm, two bits) will be helpful for clearer understanding (FIG. 12). This represents a current Hewlett Packard product.

8. Ink Limiting and Plane Split (a) Overview—Based on the foregoing understandings of how ED works, the next step upstream in FIG. 5 is to consider feeding of data into the ED. This system is using plane-independent error diffusion—meaning that no consideration is made, when deciding about one color, of decisions already made for other colors.

In the product which is a preferred embodiment, error-diffusion processing proceeds alternatively left to right and then right to left along consecutive rows. The printheads are six in number—KCMYcm—while the input files are always KCMY (once they have gone through the color pipeline, which may transform them from RGB to KCMY).

In design of this system there were several choices concerning the ideal point at which to split the cyan and magenta planes between dark and light inks. It was decided to split before halftoning, and thus to pass six independent planes of data into the error diffusion stage.

The split between dark and light inks is not trivial, in particular because there are different combinations of dark and light ink delivering the same color, but not the same total amount of ink. In other words, the plane-split process must be ink-dependent.

Therefore, it is a good point at which to perform ink limiting. The main disadvantage of this process is that it operates at pixel level, not object level.

In other words, if there is a large solid area of the same color, the system must still repeat the same operation for each pixel, even though it must always yield the same result. This feature compels design of an algorithm that gives a good tradeoff between image quality and throughput.

(b) Depletion algorithm—We may distinguish three stages in the ILPS (ink-limiting and plane-split) process (FIGS. 13 and 14). First, it is necessary to determine how much ink is to be fired onto the particular pixel being processed.

Because of all the configurable parameters throughout the halftoning pipeline (linearization, thresholds, superpixel families, and drop table), it would be impossible to predict the ink usage based on only the values of the input image. Therefore for each channel a lookup table (LUT) must be built to associate the channel value to the ink usage.

For a given pixel, the process starts by retrieving the total amount of ink for that pixel (four LUT accesses and an addition). Then, if the total amount of ink is larger than a predetermined maximum permissible ink value, the system must force the inking to that maximum value.

This supposes a reduction in the total amount of ink, which must be redistributed to each individual channel. In simplest principle, each channel should receive one quarter of the permissible maximum.

In reality, however, the black channel is the least affected by ink limiting, and the remaining ink must be distributed among CMY. The number that tells what ink reduction applies to each channel is called the "factor".

This factor will directly multiply the channel value for black and yellow, and will point to a specific combination of light/dark cyan or magenta. In other words, while the black and yellow channels don't undergo much further processing (their values are multiplied by $factor_K$ and $factor_Y$ respectively, and actually $factor_K=1$), the cyan and magenta still have another step to go.

That step relates to so-called separation curves. These exist in pairs: one for dark and another for light color (for either C or M). Also there is one pair per factor (that is, 256 pairs of M, and 256 pairs of C separation curves).

Thus it is necessary to pick the channel value for C or M, plus its respective factor. This will point to two values, one for the light ink and the other for the dark.

9. Additional Functionality

The ink-limiting and plane-split algorithm is the first one in the halftoning pipeline. This block is accessible from different paths: HPGL2, PostScript and Turbo.

The Turbo path is a continuous-tone format satisfying two different HPGL2 specifications: "CRD-7" for raster data with a customized number of pixels; and "RTL" for raster data at one bit per pixel and color plane. Both are used by a system known as "OM" or "PipeOM"—which is a pipeline for open media, and also is the one that the software RIPs are supposed to use.

The printer receives this file format through the Var-ware print manager. This manager performs pixel replication if the input file is smaller than the output.

The above disclosure is intended as merely exemplary, and not to limit the scope of the invention—which is to be determined by reference to the appended claims.

What is claimed is:

1. A printing system for printing an image based upon input image data; said system comprising:
   a printer manufactured by a printer company and having a native resolution;
   a raster image processor manufactured and programmed by one or more processor companies, different from the printer company; said processor processing such image data and transmitting processed image data to the printer;

a two-bit data pipeline carrying such in-process data through at least part of the processor; and a drop table for converting such data from the pipeline to the native resolution of the printer, said table being established by said one or more processor companies different from the printer company, and having an output dot-per-pixel structure that differs from data structure within the pipeline.

2. The system of claim 1, wherein:

the table is configured by instructions held or generated in the raster image processor.

3. The system of claim 2, wherein:

the table resides within the printer.

4. The system of claim 1, further comprising:

in the processor, precooked printmask information and procedures; and in the printer, popup printmask information and procedures for refining precooked mask information from the processor.

5. The system of claim 4, wherein the precooked and popup printmask information and procedures:

comprise nozzle-out error hiding; and have a format that expressly defines which pass prints each pixel, as distinguished from provision of a discrete binary mask for each pass.

6. The system of claim 1, wherein:

the table output dot-per-pixel structure is mapped to the data structure within the pipeline substantially thus:

| in pipeline | dots/pixel out |
|---|---|
| 0 0 | 0 |
| 0 1 | 1 |
| 1 0 | 1 |
| 1 1 | 1. |

7. The system of claim 1, wherein:

the table output dot-per-pixel structure is mapped to the data structure within the pipeline substantially thus:

| in pipeline | dots/pixel out |
|---|---|
| 0 0 | 0 |
| 0 1 | 1 |
| 1 0 | 1 |
| 1 1 | 2. |

8. The system of claim 1, wherein:

the table output dot-per-pixel structure is mapped to the data structure within the pipeline substantially thus:

| in pipeline | dots/pixel out |
|---|---|
| 0 0 | 0 |
| 0 1 | 1 |
| 1 0 | 2 |
| 1 1 | 4. |

9. The system of claim 1, wherein:

the table output dot-per-pixel structure is mapped to the data structure within the pipeline substantially thus:

| in pipeline | dots/pixel out |
|---|---|
| 0 0 | 0 |
| 0 1 | 1 |
| 1 0 | 3 |
| 1 1 | 8. |

10. The system of claim 1, wherein:

the table output dot-per-pixel structure is mapped to the data structure within the pipeline substantially thus:

| in pipeline | dots/pixel out |
|---|---|
| 0 0 | 0 |
| 0 1 | 2 |
| 1 0 | 5 |
| 1 1 | 12. |

11. The system of claim 1, further comprising:

a computer for receiving or generating such image data, and transmitting such data to the processor.

12. The system of claim 10, wherein:

the computer is also for preprocessing such received or generated image data, preparatory to transmitting to the processor.

13. The system of claim 10, particularly for use with a color image; and further comprising:

a monitor, associated with the computer, for viewing the image; and wherein:

the processor further comprises at least part of a stage for reconciling colors viewed at the monitor with colors to be printed at the printer.

14. The system of claim 10, particularly for use with a color image; and further comprising:

a monitor, associated with the computer, for viewing the image; and wherein:

the computer comprises at least part of a stage for reconciling colors viewed at the monitor with colors to be printed at the printer.

15. A method of providing a system for printing an image based on data using a printer that is manufactured by a printer company and has a native resolution; said method comprising the steps of:

manufacture and programming, by one or more companies different from the printer company, of a raster image processor for processing such data and transmitting such processed data to the printer;

provision, by said one or more companies different from the printer company, of a portion of a two-bit data pipeline carrying such in-process data through at least a part of the processor; and establishment, by said one or more companies different from the printer company, of a drop table for converting such data from the pipeline to said native resolution, said table having an output dot-per-pixel structure that differs from data structure within the pipeline.

16. The method of claim 15, further comprising:

manufacture, by the printer company, of the printer.

17. The method of claim 15, further comprising:

interconnection of the processor and printer by an end-user independent of said companies.

18. The method of claim 17, further comprising:

provision of a computer for preprocessing the data and furnishing the preprocessed data to the processor; and interconnection of the computer and processor by the independent end-user.

19. A method of providing a system for printing an image based on data using a raster image processor manufactured and programmed by one or more processor companies, said processor having a portion of a two-bit data pipeline carrying such data through at least part of the processor, and said processor further generating or holding instructions for configuring a printer drop table; said method comprising the steps of:

manufacture and programming, by a printer company different from the processor company, of a printer for receiving such image data from the processor; said printer having a native resolution; and establishment, by said printer company, of a drop table within the printer for converting such data from the pipeline to said native resolution, said table having an output dot-per-pixel structure that differs from data structure within the pipeline, and said table being configured by said instructions.

20. The method of claim 19, further comprising:

manufacture and programming, by said one or more processor companies, of the processor.

21. The method of claim 20, further comprising:

interconnection of the processor and printer by an end-user independent of said companies.

22. The method of claim 20, further comprising:

provision of a computer for preprocessing the data and furnishing the preprocessed data to the processor; and interconnection of the computer and processor by the independent end-user.

23. The method of claim 17, further comprising:

provision of a computer for preprocessing the data and furnishing the preprocessed data to the processor; and interconnection of the computer and processor by the independent end-user.

24. A printer for printing an image, based on input image data;

said printer comprising:

a plural-bit data pipeline capable of processing such data at more than one bit per pixel; and an interface for accepting an externally defined drop table for converting plural-bit data from the end of the pipeline to a specific number of dots per pixel, preparatory to printing;

wherein the number of dots per pixel defined by the table may be substantially any integral value.

25. The printer of claim 24, wherein:

the interface also accepts, in addition to the table, plural-bit image data from the end of the pipeline and a specification of a printmode defining how such data should be printed; and wherein the number of dots per pixel defined by the table may be substantially any integral value less than or equal to a number of passes defined by the printmode.

* * * * *

UNITED STATES PATENT AND TRADEMARK OFFICE
CERTIFICATE OF CORRECTION

PATENT NO. : 7,084,991 B2  
APPLICATION NO. : 09/775771  
DATED : August 1, 2006  
INVENTOR(S) : Antoni Gil Miguel et al.

Page 1 of 1

It is certified that error appears in the above-identified patent and that said Letters Patent is hereby corrected as shown below:

In column 1, line 55, delete "calorimetric" and insert -- colorimetric --, therefor.

In column 9, lines 60-63, delete "FIG. 12 is a like set of graphs augmented by two additional, coordinated ones representing the contone functions themselves—they illustrate application of linearization curves and thresholds to multilevel error diffusion;" and insert -- Fig. 12 is a linearization curve for black — i. e., a graph of linearized black vs. contone input, nine and eight bits per pixel respectively — and particularly representing a preferred embodiment that is part of a commercial product; --, therefor.

In column 17, line 40, delete "calorimetrically" and insert -- colorimetrically --, therefor.

In column 18, line 55, delete "tow" and insert -- two --, therefor.

Signed and Sealed this

Eleventh Day of August, 2009

David J. Kappos  
*Director of the United States Patent and Trademark Office*